(12) United States Patent
Zahn

(10) Patent No.: US 6,932,375 B2
(45) Date of Patent: Aug. 23, 2005

(54) TRAILER COUPLING FOR A WORK VEHICLE

(75) Inventor: Werner Zahn, Hassloch (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/772,503

(22) Filed: Feb. 5, 2004

(65) Prior Publication Data

US 2004/0155430 A1 Aug. 12, 2004

(30) Foreign Application Priority Data

Feb. 7, 2003 (DE) .......................... 103 04 978

(51) Int. Cl.$^7$ .............................. B60D 1/44; B60D 1/07
(52) U.S. Cl. ................ 280/482; 280/490.1; 280/416.1
(58) Field of Search .............................. 280/416.1, 482, 280/490.1

(56) References Cited

U.S. PATENT DOCUMENTS

| | | | |
|---|---|---|---|
| 2,850,293 A | 9/1958 | Hall | 280/491 |
| 3,664,686 A | 5/1972 | Anderson | 280/490 |
| 3,708,183 A | 1/1973 | Jones | 280/483 |
| 3,865,404 A | 2/1975 | Schwartz | 280/415 A |
| 4,368,899 A | 1/1983 | Smalley et al. | 280/477 |
| 4,373,847 A | * | 2/1983 | Hipp et al. | 414/401 |
| 4,951,957 A | 8/1990 | Gullickson | 280/479.2 |

FOREIGN PATENT DOCUMENTS

| | | |
|---|---|---|
| AT | 4 06 849 B | 9/2002 |
| DE | 101 18 862 C1 | 7/2002 |
| EP | 1 55 338 A1 | 9/1985 |
| EP | 0 843 956 B1 | 1/2002 |
| EP | 0 876 929 B1 | 9/2002 |

* cited by examiner

*Primary Examiner*—Kevin Hurley

(57) ABSTRACT

A trailer coupling for an agricultural or industrial vehicle includes two guide rails which extend vertical and parallel to each other. A support is slidingly received by horizontal extending guide grooves in the guide rails. Different couplers can be mounted on and exchanged on the support. The support may be inserted into the guides or removed from the guides.

3 Claims, 6 Drawing Sheets

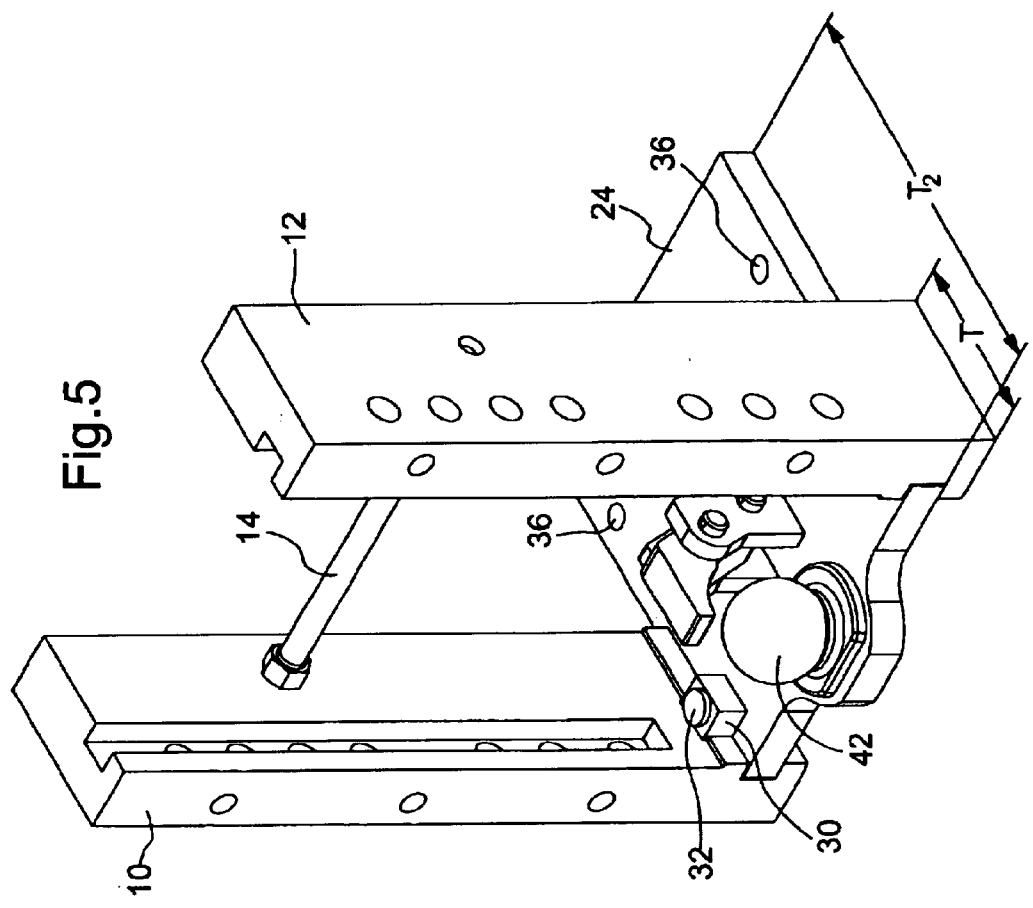
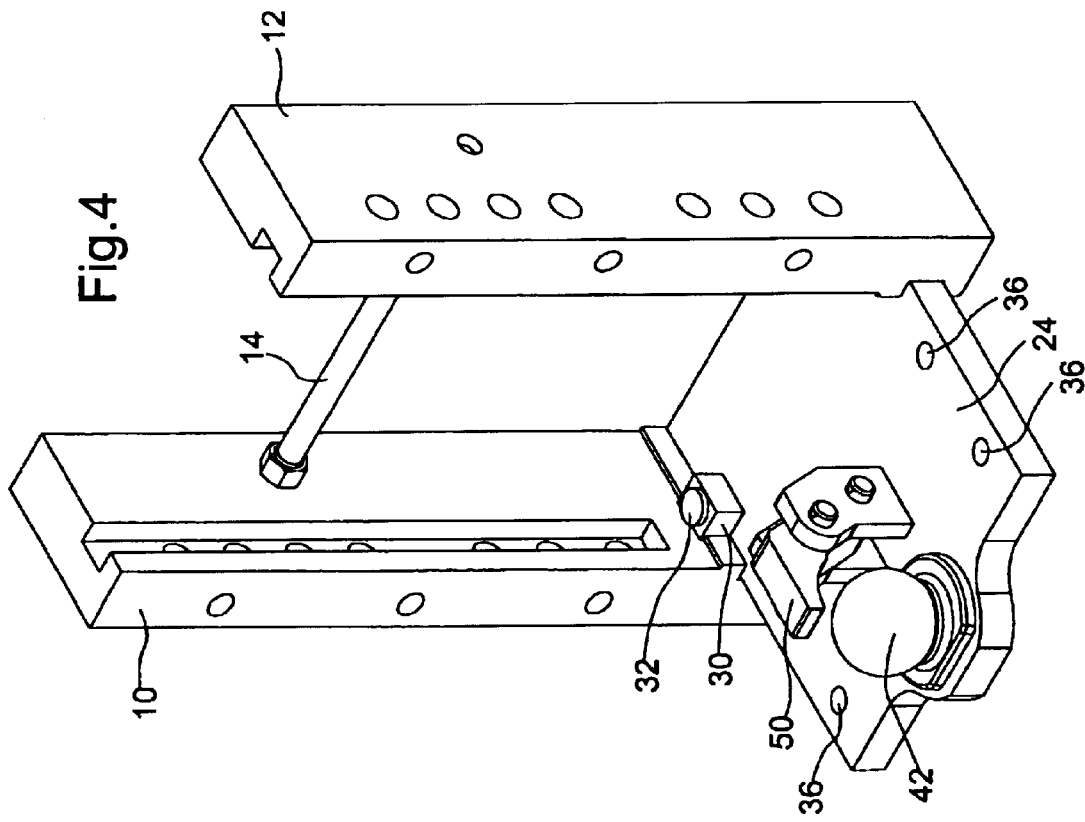

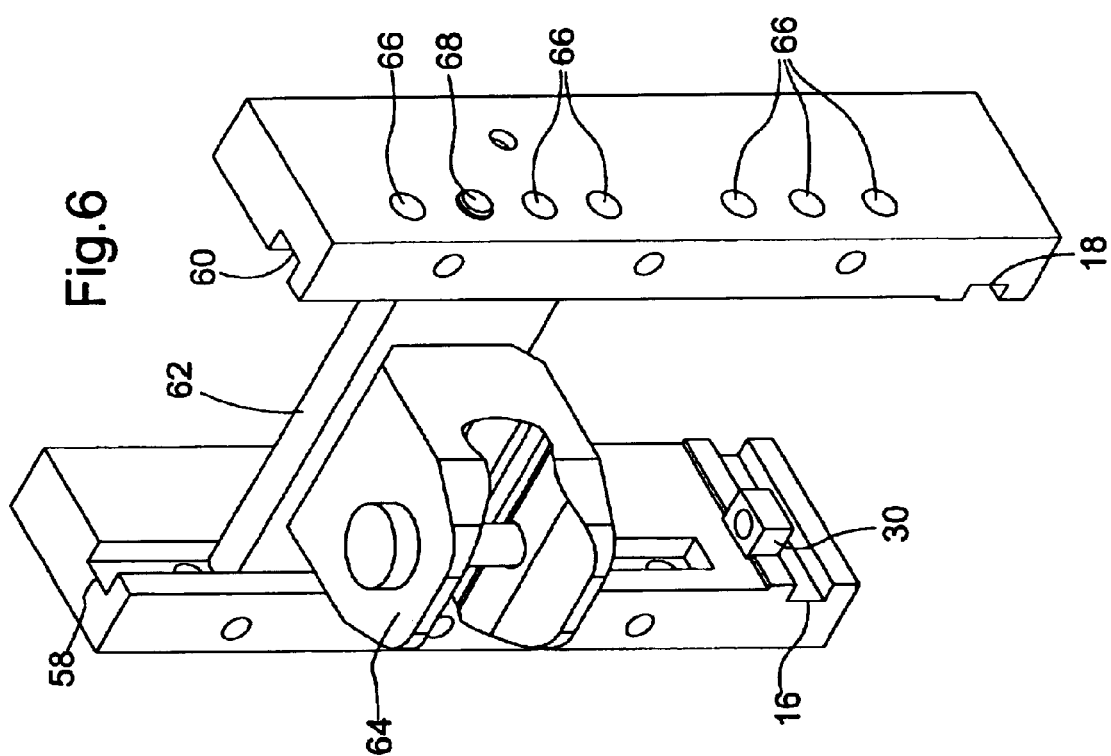

TRAILER COUPLING FOR A WORK VEHICLE

BACKGROUND

The invention relates to a trailer hitch for an agricultural or industrial work vehicle.

For conventional trailer hitches, several coupling systems, such as set forth in the standards ISO 6489 1–5, can be installed on the same carrier body only with restrictions. By exceeding the installation space, the position or the function, compared to an individual add on structure, is not completely usable. When changing from one trailer system to the other or when changing components due to wear and tear, very often the entire trailer block must be exchanged with the coupler or towing member. To enable multi purpose use of an agricultural or industrial work vehicle, especially a tractor, equipped with a trailer hitch, it is desirable to provide several coupling options for the trailer system.

A height adjustable trailer coupling is described in EP A 0 155 338 which shows a coupling jaw mounted on a coupling jaw carrier. The coupling jaw carrier is supported on its side by a trailer block, which is mounted on the vehicle by means of screws. The trailer block includes two side plates, each of which carries, on its end facing away from the vehicle, a guide rail with vertical guide grooves in which the coupling jaw carrier can move in the vertical direction. Threaded rods and nuts help to realize side stabilization of the trailer block and simultaneously set the distance between the two guide rails. The guide rails have vertical holes spaced apart from each other. The coupling jaw carrier has locks that can engage selectively in these holes, thus locking the coupling jaw carrier at a corresponding selected height position. It is desirable to provide towing members in addition to the height adjustable coupling jaw. The arrangement of additional towing members, however, is made considerably more difficult or impossible by the coupling jaw carrier, due to spatial limitations.

SUMMARY

Accordingly, an object of this invention is to provide a trailer hitch which is capable of easily receiving different couplers or towing members.

A further object of the invention is to provide such a trailer hitch which enables the attachment of different coupling systems.

These and other objects are achieved by the present invention, wherein the coupling carriers of the trailer hitch have guides that hold a support. A coupler is mounted on the support. The support and the coupler can shift in horizontally in forward and rearward directions. The support can also be removed completely from the coupling carriers. The coupler can be permanently attached to the support, such as by welding. However, the coupler is preferably removably mounted on the support so that different couplers can be mounted on the support. For example, the coupler may be threadably coupled to the support. In this way, damaged or worn couplers can be exchanged without having simultaneously to dispose of the support.

The support together with the coupler may be removed completely from the two coupling carriers. The trailer hitch includes an open space which makes room for the shifting or removing of the support, or for an adjustable drawbar. Thus, several coupling options can be provided on the work vehicle. Thus, it is possible to mount different and/or several system couplings to the same carrier body, wherein, by comparison to prior art systems, spatial restrictions can be largely avoided. For example, a tension jaw that can shift vertically and also a coupler that can shift horizontally can be mounted on the coupling carrier and adjusted and used essentially independently from each other. For the change from one trailer system to another or for a replacement of components due to wear, it is not necessary to change, remove, or exchange the entire trailer block with the coupler, but rather it is sufficient to remove or exchange just the support with the attached coupler.

Preferably, each coupling carrier has an essentially rectangular cross section with a length in the longitudinal direction of the vehicle which is greater than its width in a transverse direction. Two such coupling carriers can be mounted at the rear of the vehicle by means of a trailer or carrier block in a conventional way, as shown in EP A 0 155 338.

Preferably, the guides comprise guide grooves that are formed in the two coupling carriers. The guide grooves lie opposite each other, face each other and extend horizontally. The support engages in the guide grooves and is slidably received by the guide grooves.

Preferably, the grooves are located near the lower ends of the coupling carriers so that the level of the support and the coupler can also be kept low, so that they will not prevent the use of a higher positioned coupling jaw. When the support is removed, an open space is produced which can receive an adjustable drawbar, because the ground clearance or the horizontal position of the adjustable drawbar is no longer negatively affected by the trailer hitch.

The support is preferably a plate mounted horizontally, and the coupler is mounted or attached to the top side of the plate. Preferably, the side edges of the support are received by guide grooves of the coupling carriers. The width of the guide grooves or slots can be adapted to the plate thickness, so that the plate is slidably supported in the guide grooves.

For many applications, it is advantageous for the support and the coupling carrier to have the same depth in the fore-and-aft direction so that the mounted support does not project significantly beyond the outer dimensions of the coupling carrier, and does not limit the installation space. As a result, this produces good visibility conditions from the vehicle cab.

However, alternatively, the support may be longer than the coupling carrier, so that the coupler may be placed and locked in different positions, thus providing different coupling points. The support and coupler may be placed initially into a first, drawn out position, for which the coupling point has been displaced away from the vehicle towards the device to be towed (towards the back). In this position, the coupling point can be seen clearly from the vehicle cabin so that the coupling procedure is simplified. After the towed element of an attached implement is coupled to the coupler, the support and coupler can be moved towards the vehicle into a second, pushed-in or operating position and locked therein. For this purpose, the depth of the support may be two to three times the depth of the coupling carrier.

The coupler may be a ball-type trailer coupling or an upwardly projecting post. The trailer coupling includes a conventional lock or hold down clamp, which prevents undesired unlocking or detachment of a towed element. Thus, this trailer hitch provides a coupling system with towing members that are simple to exchange, and enables a quick change between a ball type coupling and a post type coupling.

Preferably, the support can be locked on the coupling carriers in at least one position by using bolts, which are inserted into corresponding recesses of the coupling carrier and the support. The bolt may be received in a vertical hole in a clip mounted on one the coupling carriers. It is possible to provide as a lock an automatic lock that automatically locks when the support is shifted and fixes the support on the coupling carrier when the support has been shifted to a certain position.

The hitch may include a vertically adjustable crossbar which extends between the coupling carriers, on which another trailer coupling can be mounted. Preferably, the coupling carriers have vertical grooves and which slidably receive the crossbar. Thus, an implement may be optionally coupled on either the horizontally shifting coupler or the vertically adjustable trailer coupling. No complicated modification work is necessary to change the device to be coupled or to change the type of coupling.

BRIEF DESCRIPTION OF THE DRAWINGS

FIG. 4 is an oblique view of a trailer hitch according to the invention with a ball type coupling in the outer position;

FIG. 5 is an oblique view of a trailer hitch according to the invention with a ball type coupling in the inner position;

FIG. 6 is an oblique view of two coupling carriers for a trailer hitch according to the invention that hold a crossbar.

DETAILED DESCRIPTION

Figure 1:
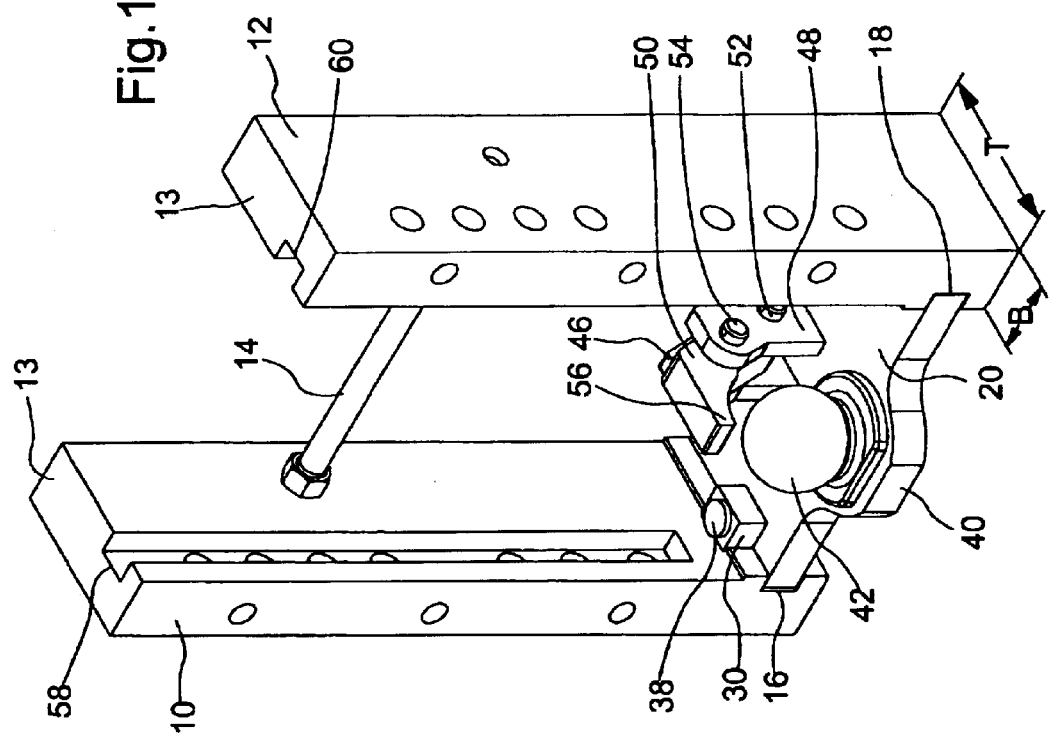
FIG. 1 is an oblique view of a trailer hitch according to the invention with a ball type coupling.
Figure 7:
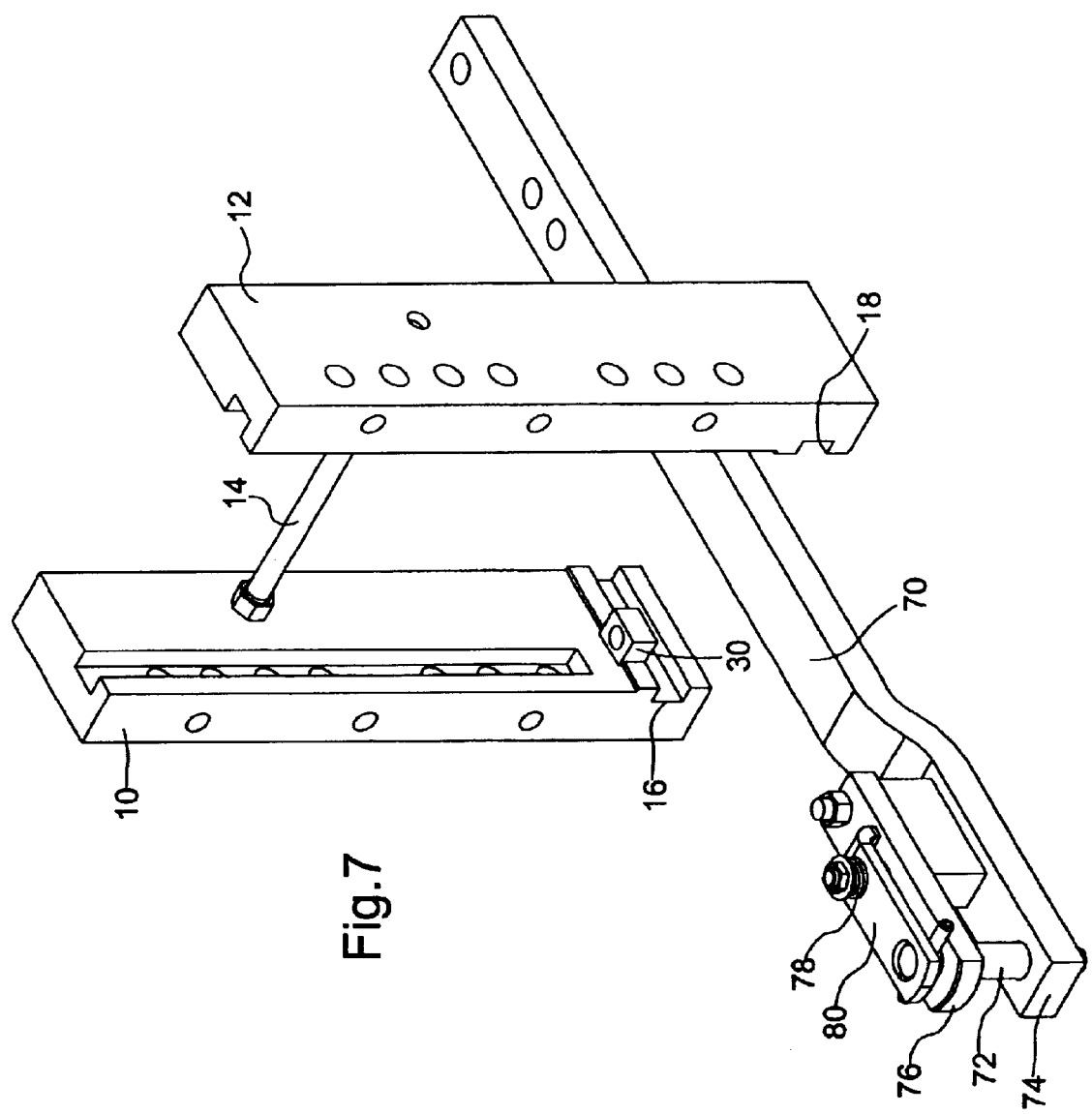
FIG. 7 is an oblique view of two coupling carriers for a trailer hitch according to the invention, between which an adjustable drawbar extends.

Referring to FIGS. 1 and 7, a hitch includes two coupling carriers 10, 12, which extend essentially vertically and which have essentially a rectangular profile 13. The coupling carriers 10, 12 can be mounted in a conventional manner by means of a trailer or carrier block (not shown) at the rear of a vehicle (not shown). However, it may be mounted at other positions on a vehicle, such as in its front region. In the Figures, the same or corresponding components are provided with the same reference numbers.

The coupling carriers 10, 12 has a profile 13 with a fore-and-aft depth T which is greater than its transverse width B. The coupling carriers 10, 12 may be reinforced relative to each other by a crosstie rod 14 whose ends are each screwed into one of the two coupling carriers 10, 12. Near its lower end, each coupling carrier 10, 12 has a horizontal fore-and-aft extending guide groove 16, 18, with an essentially rectangular cross section. The guide grooves 16, 18 open towards each other.

The hitch includes a horizontally oriented plate or support 20, 22, 24, the edges of which are received by the grooves 16, 18. The plate 20, 22, 24 can be locked in one position or in several positions relative to the coupling carriers 10, 12, by a lock which is shown merely schematically. The lock includes a clip 30 which is mounted to each coupling carrier 10, 12 and which projects inwardly from one coupling carrier 10, 12 and towards the other coupling carrier 10, 12.

A vertical hole 32 extends through each clip 30. In the plates 20, 22, 24, there are corresponding vertical holes 34, 36 whose position can be selected freely with reference to the fore-and-aft direction, corresponding to requirements. The plate 20, 22, 24 can be shifted in the guide grooves 16, 18, so that the holes 32 of the clip 30 align with the holes 34, 36 of the plate 20, 22, 24. Each allows a bolt 38 to be inserted through the aligned holes 32, 34, 36 in order to fix the plate 20, 22, 24 relative to the coupling carrier 10, 12. The plates 24 shown in FIGS. 4 and 5 have two holes 36 on each side. This makes it possible to fix the plate 24 in two different positions relative to the coupling carriers 10, 12.

Figure 3:
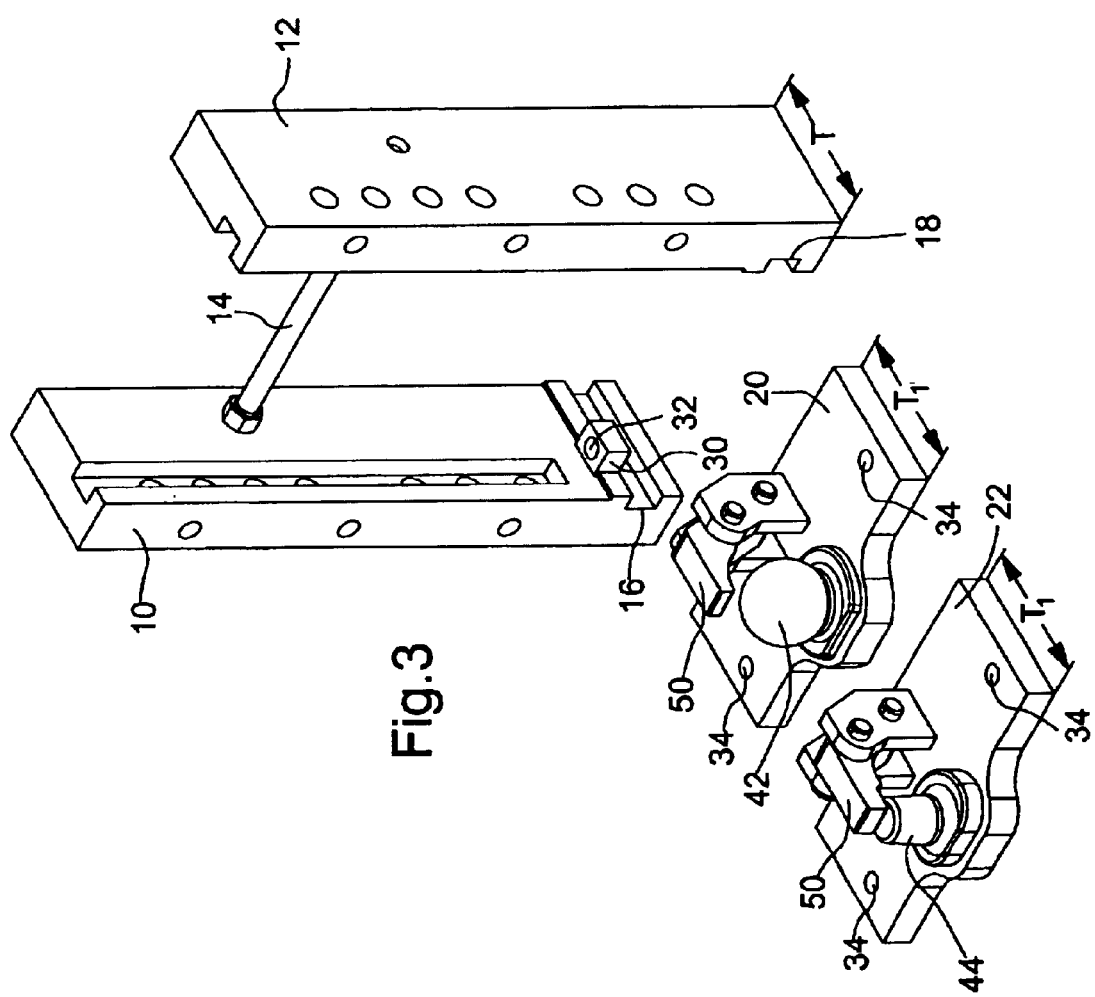
FIG. 3 is an oblique view of a trailer hitch according to the invention with a ball type coupling and a piton type coupling, which can be used optionally.

The plates 20, 22 shown in FIGS. 1 and 3 have a depth T1, which corresponds approximately to the depth T of the coupling carrier. By contrast, the depth T2 of the plate 24 shown in FIGS. 4 and 5 has a larger dimension which is approximately two and one half times the depth T of the coupling carrier.

Figure 2:
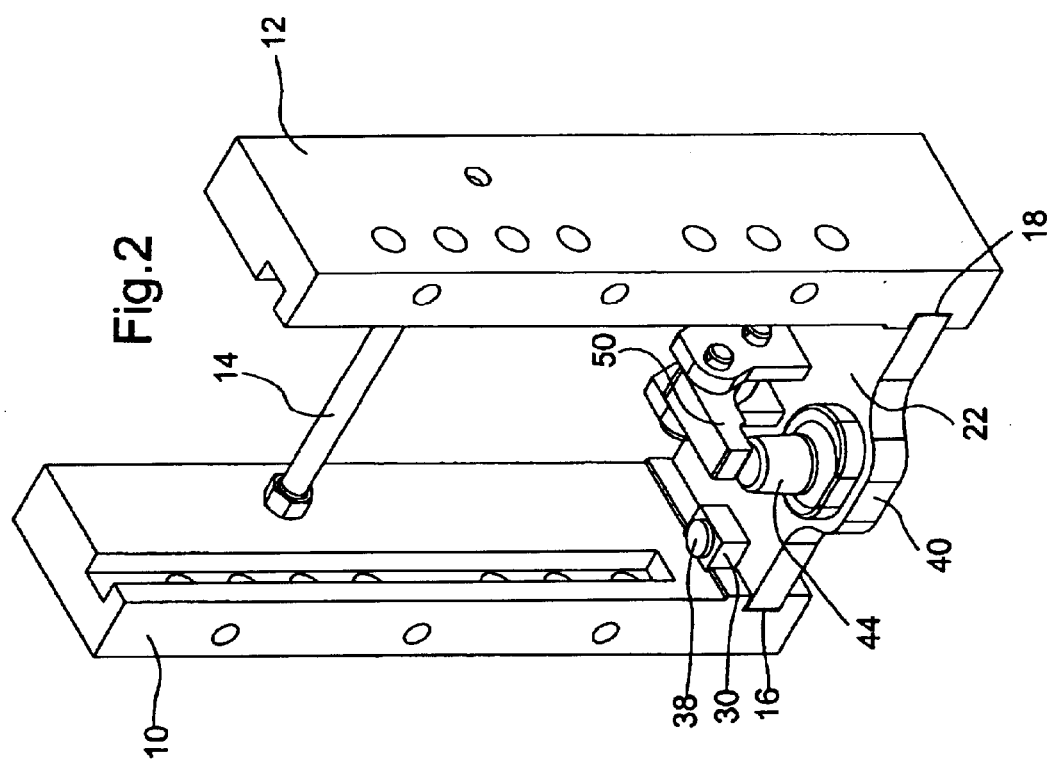
FIG. 2 is an oblique view of a trailer hitch according to the invention with a piton type coupling.

A centered bulge 40 projects rearwardly from the rear end of the plates 20, 22, 24. An upwardly projecting coupler 42, 44 is attached to the plate in the region of this bulge 40, such as by welding, screwing, or in some other way. The coupler shown in FIGS. 1, 4, and 5 is a ball type coupling 42, such as described by ISO Standard 6489, part 5. The coupler shown in FIG. 2 is a post type coupling 44, such as described by ISO Standard 6489, part 4.

A locking device is provided for both coupling types that prevents a coupled towed element, not shown, from becoming detached unintentionally from the coupler 42, 44. In the embodiment shown, the locking element consists of two bearing blocks 46, 48, between which a hold down clamp 50 is mounted so that it can pivot about a bolt axis 52. A fastening bolt 54 is provided for locking. If the fastening bolt 54 is removed, the hold down clamp 50 with its nose 56 lying over the coupler 42, 44 can be pivoted upwards about the bolt axis 52 so that the towed element is released and can be detached from the coupler 42, 44.

Perpendicular grooves 58, 60 are formed in the sides of the coupling carriers 10, 12 facing each other. These grooves 58, 60 slidably receive a crossbar 62 that can shift vertically, as shown in FIG. 6. A conventional trailer jaw 64 is attached to the crossbar 62. The crossbar 62 can be fixed in positions at different heights. Perpendicular holes 66 are provided in the coupling carriers 10, 12 through which bolts 68 can be inserted that engage in openings (not shown) in the crossbar 62 for adjustment at a desired height. Other known means can also be used for height adjustment of the crossbar 62, such as described in EP patent A 0 155 338.

FIG. 7 shows two coupling carriers 10, 12 without a support. It can be seen that the space provided for the support now can be occupied by another installation or trailer system, such as a conventional adjustable drawbar 70. The adjustable drawbar 70 contains a hitching bolt 72 at its free end that can be inserted through recesses in a bottom clip 74 and a top clip 76 of the adjustable drawbar 70. The hitching bolt 72 is secured in the recesses so that it does not unintentionally slide out by means of a support 80 pretensioned by a spring 78.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A trailer hitch for a work vehicle, the hitch comprising:

two coupling carriers which extend parallel to each other and which are aligned vertically, the coupling carriers having guides provided thereon;

a support received by the guides, the support having a fore-and-aft dimension (T2) which is at least two to three times as large as the fore-and-aft dimension (T) of the coupling carrier; and a coupler attached to the support, the support being shiftable horizontally in forward and rearward directions.

2. A trailer hitch for a work vehicle, the hitch comprising:

two coupling carriers which extend parallel to each other and which are aligned vertically, the coupling carriers having guides provided thereon;

a support received by the guides;

a coupler attached to the support, the support being shiftable horizontally in forward and rearward directions;

a vertically adjustable crossbar extends between the coupling carriers; and a trailer coupling is attached to the crossbar.

3. The trailer hitch of claim 2, wherein:

the coupling carrier has vertical guides, in particular vertical grooves, which are used for vertical guidance of the crossbar.

* * * * *